United States Patent
Myers et al.

(10) Patent No.: US 7,171,046 B2
(45) Date of Patent: Jan. 30, 2007

(54) METHOD AND APPARATUS FOR PORTABLY RECOGNIZING TEXT IN AN IMAGE SEQUENCE OF SCENE IMAGERY

(75) Inventors: Gregory K. Myers, San Francisco, CA (US); Paul K. Gallagher, San Jose, CA (US)

(73) Assignee: SRI International, Menlo Park, CA (US)

( * ) Notice: Subject to any disclaimer, the term of this patent is extended or adjusted under 35 U.S.C. 154(b) by 8 days.

(21) Appl. No.: 10/994,760

(22) Filed: Nov. 22, 2004

(65) Prior Publication Data

US 2005/0123200 A1    Jun. 9, 2005

Related U.S. Application Data

(62) Division of application No. 09/897,786, filed on Jun. 29, 2001, now Pat. No. 6,823,084.

(60) Provisional application No. 60/234,813, filed on Sep. 22, 2000.

(51) Int. Cl.
G06K 9/00 (2006.01)
G06K 9/22 (2006.01)
G06K 9/30 (2006.01)

(52) U.S. Cl. .................. 382/187; 382/313

(58) Field of Classification Search ........... 382/181, 382/187, 189, 312, 313, 321, 278, 188, 190; 358/473; 345/163, 164, 165, 166; 235/472.01
See application file for complete search history.

(56) References Cited

U.S. PATENT DOCUMENTS

| | | | | |
|---|---|---|---|---|
| 5,235,433 A | * | 8/1993 | Clarkson et al. | 358/434 |
| 5,506,918 A | * | 4/1996 | Ishitani | 382/289 |
| 5,960,114 A | | 9/1999 | Dauerer et al. | |
| 6,394,346 B1 | * | 5/2002 | Bonneau et al. | 235/438 |
| 6,441,927 B1 | | 8/2002 | Dow et al. | |
| 6,473,517 B1 | * | 10/2002 | Tyan et al. | 382/105 |
| 6,473,523 B1 | * | 10/2002 | Newman et al. | 382/176 |

(Continued)

FOREIGN PATENT DOCUMENTS

| | | |
|---|---|---|
| EP | 0702329 | 3/1996 |
| EP | 0877335 | 11/1998 |

OTHER PUBLICATIONS

"Translation Camera", by Yasuhiko Watanabe et al; Dept. of Electron & Information, Ryukoku University: Pattern Recognition; Fourteenth International Conference, Aug. 1998, pp. 613-617 vol. 1.

(Continued)

*Primary Examiner*—Yon J. Couso
(74) *Attorney, Agent, or Firm*—Kin-Wah Tong, Esq.; Patterson & Sheridan, LLP

(57) ABSTRACT

An apparatus and a concomitant method for portably detecting and recognizing text information in a captured imagery. The present invention is a portable device that is capable of capturing imagery and is also capable of detecting and extracting text information from the captured imagery. The portable device contains an image capturing sensor, a text detection module, an OCR module, a storage device and means for presenting the output to the user or other devices.

17 Claims, 8 Drawing Sheets

U.S. PATENT DOCUMENTS

| | | | |
|---|---|---|---|
| 6,611,598 B1 * | 8/2003 | Hayosh | 380/54 |
| 6,688,523 B1 * | 2/2004 | Koenck | 235/462.06 |
| 6,823,084 B2 | 11/2004 | Myers et al. | |
| 6,922,487 B2 | 7/2005 | Dance et al. | |
| 6,947,609 B2 | 9/2005 | Seeger et al. | |
| 7,031,553 B2 | 4/2006 | Myers et al. | |
| 2002/0037104 A1 | 3/2002 | Myers, et al. | |
| 2002/0051575 A1 | 5/2002 | Myers, et al. | |
| 2002/0180726 A1 | 12/2002 | Shi et al. | |
| 2003/0169923 A1 | 9/2003 | Butterworth | |
| 2005/0100216 A1 | 5/2005 | Myers, et al. | |
| 2005/0123200 A1 | 6/2005 | Myers, et al. | |
| 2005/0259866 A1 | 11/2005 | Jacobs, et al. | |
| 2006/0029296 A1 | 2/2006 | King, et al. | |
| 2006/0050996 A1 | 3/2006 | King, et al. | |

OTHER PUBLICATIONS

Baird, H., "The Skew Angie of Printed Documents," SPSE Annual Conference, 1987, p21-24.

Messelodi, et al., "Automatic Identification And Skew Estimation Of Text Lines In Real Scene Images", Pattern Recognition 32(5), 1999, pp.791-810.

Myers, et al., "Recognition of Text in 3-D Scenes," 4th Symp on Document Image Understanding Technology, Apr. 23-25, 2001.

International Written Opinion, dated Feb. 13, 2004 for PCT Application, PCT/US01/29768.

International Search Report, dated Oct. 7, 2002 for PCT Application PCT/US01/29768.

* cited by examiner

METHOD AND APPARATUS FOR PORTABLY RECOGNIZING TEXT IN AN IMAGE SEQUENCE OF SCENE IMAGERY

CROSS REFERENCE TO RELATED APPLICATIONS

This application is a divisional application of U.S. patent application Ser. No. 09/897,786, filed Jun. 29, 2001 now U.S. Pat. No. 6,823,084, which in turn claims the benefit of U.S. Provisional Application No. 60/234,813 filed on Sep. 22, 2000, both of which are herein incorporated by reference.

REFERENCE TO GOVERNMENT FUNDING

This invention was made with Government support under Contract No. 97-F132600-000, awarded by DST/ATP/Office of Advanced Analytic Tools. The Government has certain rights in this invention.

FIELD OF THE INVENTION

The present invention relates to an apparatus and concomitant method for digital image processing. More specifically, the present invention provides text recognition in an image sequence of scene imagery, e.g., three-dimensional (3D) scenes of the real world.

BACKGROUND OF THE DISCLOSURE

Video and scene imagery are increasingly important sources of information. The proliferation and availability of devices such as digital still cameras and digital video cameras are clear evidence of this trend.

Aside from the general scenery, e.g., people, and the surrounding landscape, many captured imagery often contain text information (e.g., broadly including letters, numbers, punctuation and symbols). Although the captured text information is easily recognizable by a human viewer, this important text information is often not detected and deciphered by the portable image capturing device and therefore is not immediately utilized by the operator of the portable image capturing device.

However, it has been noted that recognizing text that appears in real-world scenery is potentially useful for characterizing the contents of video imagery, i.e., gaining insights about the imagery. In fact, the ability to accurately deduce text information within real-world scenery will enable the creation of new applications that gather, process, and disseminate information about the contents of captured imagery.

Additionally, the volume of collected multimedia data is expanding at a tremendous rate. Data collection is often performed without real time processing to deduce the text information within the captured data. For example, captured imagery can be stored in a portable device, but no processing is performed to detect and extract text information within the captured imagery. Thus, benefits associated with real time text detection and extraction are not realized in portable imagery capturing devices.

Therefore, a need exists in the art for an apparatus and method to portably detect and extract text information from captured imagery, thereby allowing new implementations for the gathering, processing, and dissemination of information relating to the contents of captured imagery.

SUMMARY OF THE INVENTION

The present invention is an apparatus and a concomitant method for portably detecting and recognizing text information in captured imagery. In one embodiment, the present invention is a portable device that is capable of capturing imagery and is also capable of detecting and extracting text information from the captured imagery. The portable device contains an image capturing sensor, a text detection module, an OCR module, and means for presenting the output to the user or other devices. Additional modules may be necessary for different embodiments as described below.

In a first embodiment, the present device is deployed as a portable language translator. For example, a user travelling in a foreign country can capture an imagery having text (e.g., taking a picture of a restaurant menu). The text within the captured imagery is detected and translated to a native language of the user. A pertinent language translator can be loaded into the portable device.

In a second embodiment, the present device is deployed as a portable assistant to an individual who is visually impaired or who needs reading assistance. For example, a user shopping in a store can capture an imagery having text (e.g., taking a picture of the label of a product). Another example is a child taking a picture of a page in a book. The text within the captured imagery is detected and audibly broadcasted to the user via a speaker.

In a third embodiment, the present device is deployed as a portable notebook. For example, a user in an educational environment can capture an imagery having text (e.g., taking a picture of a white board, view graph or a screen). The text within the captured imagery is detected and stored in a format that can be retrieved later for text processing, e.g., in a word processor format.

In a fourth embodiment, the present device is deployed as a portable auxiliary information accessor. For example, a user in a business environment can capture an imagery having text (e.g., taking a picture of a billboard or a business card having an Internet or web address). The text within the captured imagery is detected and the Internet address is accessed to acquire additional information.

In a fifth embodiment, the present device is deployed as a portable navigation assistant. For example, the portable unit is deployed in a vehicle for automatic reading of road signs and speed limit signs. The text within the captured imagery is detected and is provided to the computer in the vehicle for assisting the vehicle's navigation system or as a warning indicator to the driver on an instrument panel.

In a sixth embodiment, the present device is deployed as a portable law enforcement assistant. For example, the portable unit is deployed in a police vehicle or in a hand-held device for reading license plates, vehicle identification numbers (VINs) or driver licenses and registrations. The text within the captured imagery is detected and is used to provide information to a law enforcement officer as to the status of a vehicle or a driver.

In a seventh embodiment, the present device is deployed as a portable inventory assistant. For example, a user in a store or a warehouse can capture an imagery having text (e.g., taking a picture of a product on a shelf or high up on a scaffold). In another example, the odometer reading for a returned rental car could be automatically captured. The text within the captured imagery is detected and is used for inventory control.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
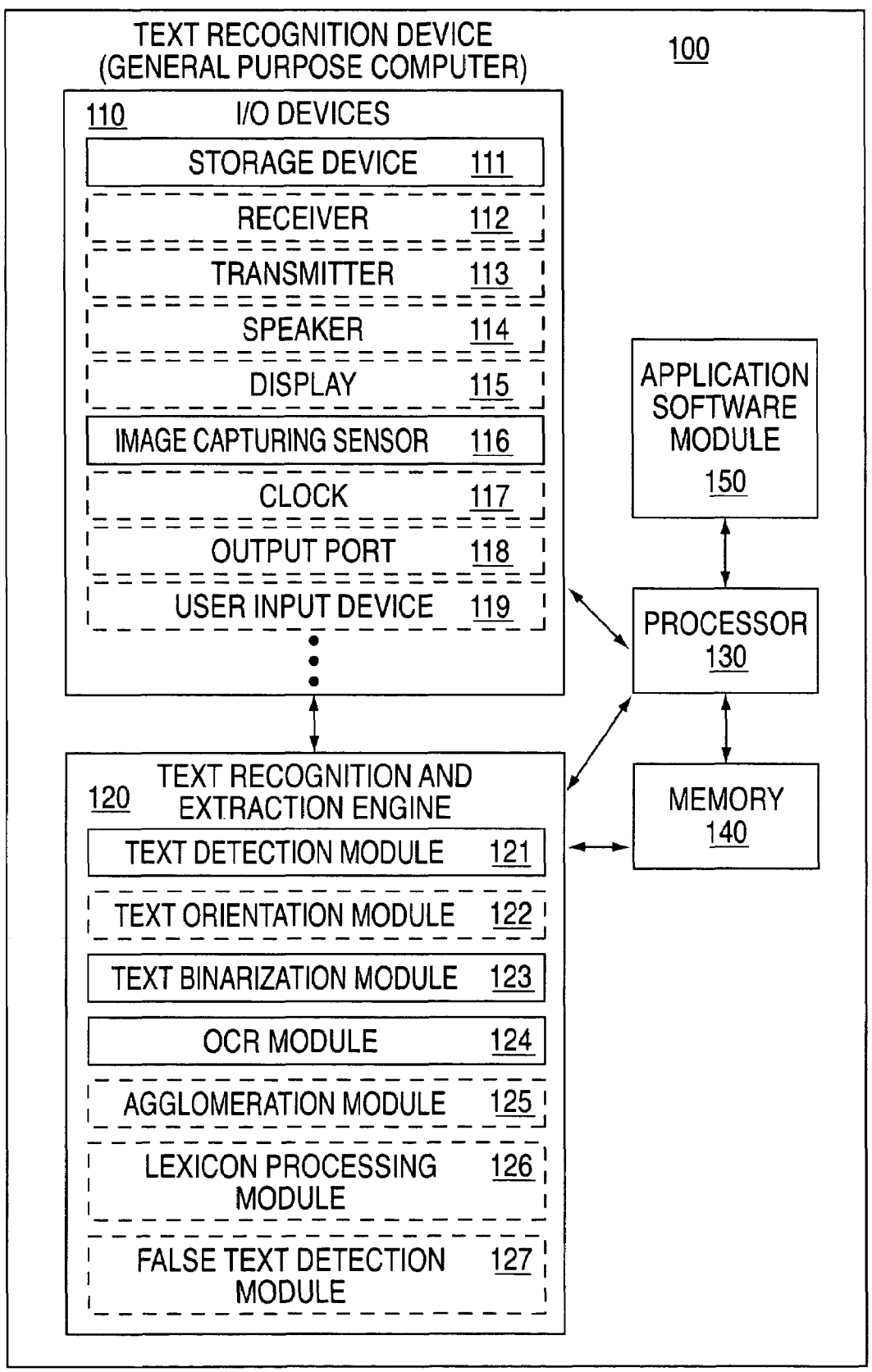
FIG. 1 illustrates a block diagram of a portable text recognition system of the present invention.

FIG. 1 illustrates a block diagram of a portable text recognition device or system 100 of the present invention. In one embodiment, the portable text recognition device or system 100 is implemented using a general purpose computer or any other hardware equivalents. More specifically, the recognition device or system 100 is preferably implemented as a portable device. In an alternative embodiment, all or various components of system 100 can be adapted to a digital video camera or digital still camera.

Thus, text recognition device or system 100 comprises a processor (CPU) 130, a memory 140, e.g., random access memory (RAM) and/or read only memory (ROM), a text recognition and extraction engine 120, and various input/output devices 110, (e.g., storage devices 111, including but not limited to, a tape drive, a floppy drive, a hard disk drive or a compact disk drive), a receiver 112, a transmitter 113, a speaker 114, a display 115, an image capturing sensor 116, e.g., those used in a digital still camera or digital video camera, a clock 117, an output port 118, a user input device 119 (such as a keyboard, a keypad, a mouse, and the like, or a microphone for capturing speech commands).

It should be understood that the text recognition and extraction engine 120 can be implemented as physical devices that are coupled to the CPU 130 through a communication channel. Alternatively, the text recognition and extraction engine 120 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 140 of the computer. As such, the text recognition and extraction engine 120 (including associated data structures) of the present invention can be stored on a computer readable medium, e.g., RAM memory, magnetic or optical drive or diskette and the like.

The text recognition and extraction engine 120 comprises a text detection module 121, a text orientation module 122, a text binarization module 123, an optical character recognition (OCR) module 124, an agglomeration module 125, a lexicon processing module 126, and a false text detection module 127. In operation, the text recognition and extraction engine 120 is able to accurately detect and extract text information from an input image or video imagery. A detailed description of the functions of the text recognition and extraction engine 120 is disclosed below with reference to FIG. 2. The text results from the text recognition and extraction engine 120 is then provided to the processor 130 and application software module 150 for further processing to provide various functionalities or services. The application software module 150 implements these functionalities or services, which include, but are not limited to, automatic text recognition with audio playback or visual display (e.g., street signs, placards, restaurant menus, billboards, white boards, labels, or books), automatic text translation to a foreign language, automatic access to auxiliary information, automatic road sign reading for navigation, automatic license plate reading for law enforcement functions, image and video indexing and archiving and inventory and shelf restocking control. Each of these embodiments is further discussed below.

It should be noted that seven (7) different embodiments of the present invention are described below. Since each embodiment provides different functionality, the hardware and software requirements are different for each of the embodiments. As such, the text recognition device or system 100 of FIG. 1 is illustrated with various elements in solid lines and dash lines. The elements in solid lines are those elements that are typically considered as required elements, whereas elements in dashed lines are considered optional elements. Thus, although FIG. 1 serves as a block diagram for all seven embodiments as described below, it should be understood that each embodiment may comprise all or only a subset of all the elements as shown in FIG. 1.

Figure 2:
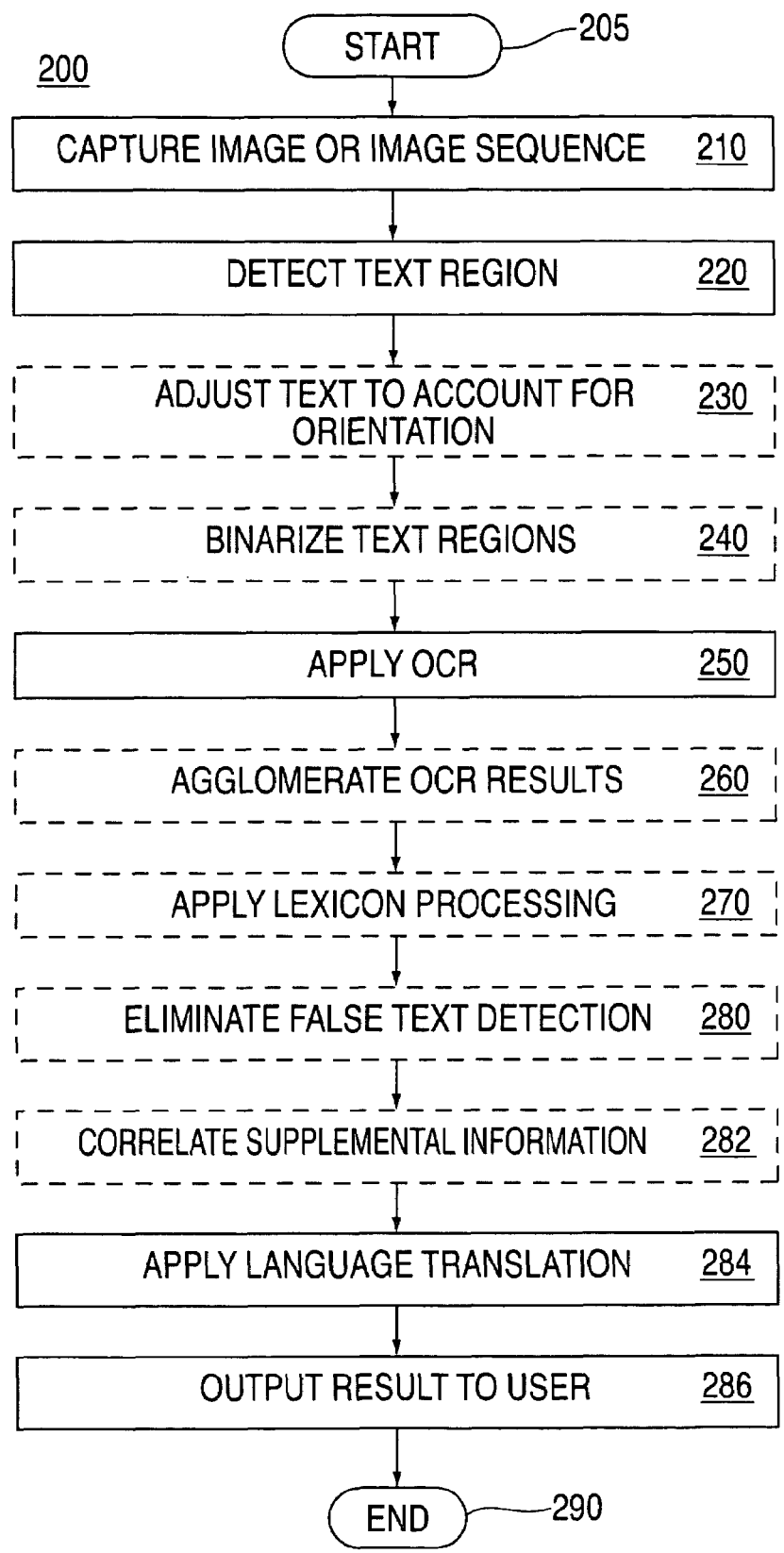
FIG. 2 illustrates a method of utilizing the portable text recognition system of the present invention in a first embodiment.

FIG. 2 illustrates a method of utilizing the portable text recognition system of the present invention in a first embodiment. In a first embodiment, the present device is deployed as a portable language translator. For example, a user travelling in a foreign country can capture an imagery having text (e.g., taking a picture of a restaurant menu, a transit schedule, signs, placards). The text within the captured imagery is detected and translated to a native language of the user. A pertinent language translator can be loaded into the portable device.

Specifically, the method is designed for portably detecting and reading text appearing in video or still imagery. The system 100 of FIG. 1 employing method 200 can accept a video or still image signal and recognize text in real time. It should be noted that the term "captured imagery" in the present application may encompass, in part or in whole, a single still image or video frame, and/or a sequence of still images or video frames.

Method 200 starts in step 205 and proceeds to step 210, where an image or an image sequence (e.g., video) is captured via conventional equipment, e.g., image capturing sensor 116. Alternatively, step 210 can be omitted if the captured imagery was previously captured and is simply being retrieved from a storage device 111.

In step 220, method 200 detects, locates, and tracks text region within the captured imagery. Different text region detection, location, and tracking methods can be employed in step 220. For example, a text detection method is disclosed in US patent application entitled "Method And Apparatus For Recognizing Text In An Image Sequence Of Scene Imagery" with attorney docket SRI/4483-2, which is herein incorporated by reference and is filed simultaneous herewith.

In brief, method 200 approaches text detection and location with the assumption that the text is roughly horizontal, and that the characters have a minimum contrast level compared with the image background. The text may be of either polarity (light text on a dark background, or dark text on a light background). The method first detects vertically oriented edge transitions in the gray-scale image, using a local neighborhood edge operator. The output of the operator is thresholded to form two binary images, one for dark-to-light transitions (B1), and the other for light-to-dark transitions (B2). A connected components algorithm is applied on each binary image. The connected components that have been determined (by examining their height and area) not due to text are eliminated. The remaining connected components are linked to form lines of text by searching the areas to the left and right of each connected component for additional connected components that are compatible in size and relative position. Finally, a rectangle is fitted to each line of detected text or a group of lines of text using the moments of all connected components used to locate the text. Tracking text over multiple consecutive video frames is achieved by computing the frame-to-frame displacement of the pixels in a set of local neighborhoods, or finding and following distinctive shape features, such as the ends of character strokes, and then computing a geometric transformation that characterizes the frame-to-frame displacement of corresponding text regions.

In step 230, method 200 may optionally adjust the detected text to account for orientation. Namely, text in a captured imagery is often viewed from an oblique angle. Such a configuration is quite common when the main subject of the scene is not the text itself, but such incidental text could be quiet important (for example, it may be the only clue of the location of the captured imagery). Thus, method 200 may apply a processing step in step 230 to account for text orientation, thereby improving the OCR method that will be applied at a later processing stage. Example of an orientation adjustment method of step 230 is again provided in U.S. patent application with attorney docket SRI/4483-2, which is filed simultaneous herewith.

In step 240, method 200 optionally applies binarization of the detected text regions. Binarization is performed on each text line independently. If the OCR processing 250 operates on a gray-scale imagery instead of on binary images, the processing in step 240 would not be required. Different binarization methods can be employed in step 240. For example, a binarization method is disclosed in U.S. patent application with attorney docket SRI/4483-2.

In brief, step 240 performs binarization on each text line by first determining the polarity of the text line, and then performing binarization of the text line. The polarity is determined by comparing grayscale pixel values above and below the baselines. This relies on the inside pixels (those below the top and above the bottom baselines) most likely being character pixels and the outside pixels (those above the top and below the bottom baseline) most likely being background pixels. The polarity calculation compares pairs of pixels along both baselines and sums the number of times the inside pixel is greater than the outside pixel. If this sum is greater than zero, the polarity is determined to be light text on a dark background; otherwise, the polarity is determined to be dark text on a light background. In binarization, the gray-scale image is smoothed with a Gaussian kernel, and histograms H1 and H2 are computed. Histogram H1 is composed of gray-scale pixels in the smoothed image on the right side of the connected components in the dark-to-light edge transition image B1 and on the left side of the light-to-dark edge transition image B2. If light text is in this text region, these are the pixels most likely to belong to light text or near the edge of light text. Similarly, histogram H2 is composed of gray-scale pixels in the smoothed image on the right side of the connected components in image B2 and on the left side of the image B1. The threshold for the text line is then set to the gray value at the $60^{th}$ percentile of histogram H1 or H2, depending on the polarity chosen. Alternatively, more than one binarizaton result for each text line is produced, each using a different threshold value (e.g., 45th percentile, 60th percentile, and 75th percentile). Producing more than one binarization result, and sending them through the OCR process (Step 250) can, after combining the OCR results with agglomeration (Step 260), sometimes yield more accurate results than processing a single binarization result.

Returning to FIG. 2, in step 250, method 200 applies OCR processing to the text regions. In one embodiment, step 250 is achieved by using a commercially available OCR engine e.g., an OCR package from Scansoft, Inc. of Peabody, Mass. However, it should be noted the present invention is not so limited and that other OCR packages may also be used. It should be noted that some OCR engines operate on a gray-scale imagery instead of binary images and therefore would not require the processing in step 240. The OCR engine produces one or more candidate identities for each recognized text character in the image, rank-ordered according to likelihood.

In step 260, method 200 may optionally agglomerate the OCR results. Specifically, a video text recognition process usually involves performing optical character recognition (OCR) on images derived from individual video frames. However, in many applications the same text persists in the scene for some length of time. Digitized video frames of the same scene may vary slightly, thereby causing an OCR process operating on individual frames to produce slightly different results. Therefore, method 200 may combine ("agglomerate") OCR results from multiple frames, in a manner that takes the best recognition results from each frame and forms a single result. The use of agglomeration improves the recognition accuracy over that of the OCR results on individual images. It also enables the system to avoid outputting the same results repeatedly when the text is persistent in the video sequence for many frames, and reduces the generation of false characters from non-text image regions. In addition, because the agglomeration process works on OCR results (as opposed to image pixels) from multiple frames, it is computationally fast enough to implement in a real-time system (i.e. one that keeps up with the video display rate). Example of an agglomeration method is disclosed in US patent application with attorney docket SRI/4483-2.

In step 270, method 200 may optionally apply lexicon processing. Step 270 is achieved by first choosing hypothesized word identities from a lexicon that contain character substrings found in the OCR results produced by step 260. The process then selects the most likely hypothesized words by comparing their characters with the OCR results (including lesser-ranked candidate character identities). The contents of the lexicon is dynamically determined based on the information context—for example, by the task (such as a list of breakfast cereals for grocery shopping), or by the location or environment that the user is operating in (such as a geographic gazetteer for navigation). The contents of the lexicon may be selected from files pre-loaded on the Portable Text Recognition Device 100, or it may be accessed from the web via a wireless link via receiver 112 and transmitter 113 during operation of the device.

In step 280, method 200 may optionally eliminate false text detection (e.g., low confidence and non-alphabetic text). Specifically, method 200 looks for OCR results containing low-confidence and non-alphabetic text that are likely to be caused by graphic or other non-text elements in the image. Example of a false text detection method of step 280 is again provided in U.S. patent application with attorney docket SRI/4483-2, which is filed simultaneously herewith.

In step 282, method 200 may optionally correlate supplemental information in accordance with the detected text information. For example, if the user is travelling in Germany and has taken a picture of a menu in German, then method 200 may optionally provide information relating to certain detected words in the menu. For example, white asparagus is a seasonal produce and is strongly favored by Germans during the late spring season. If the term for white asparagus is detected, method 200 in step 282 may correlate this detected term with additional information that is retrieved for the user. This optional step can be employed in conjunction with step 270 where a lexicon pertaining to travel to Germany is previously loaded in a storage 111 of the portable text recognition device 100. Alternatively, if receiver 112 and transmitter 113 are deployed, then the correlated supplemental information can be retrieved and downloaded into the portable text recognition device 100.

Another example is where the user is travelling in a foreign country and has captured an imagery that contains a street sign. Method 200 may then optionally provide supplemental information relating to the detected street name. For example, method 200 may provide a list of restaurants, hotels, metro stations, bus stops, and famous landmarks that are in the immediate vicinity to the user. It should be noted that the term "travel information" as used in the present application comprises one or more of the following information: restaurants, hotels, train stations, bus stops, airports, landmarks, emergency facilities (e.g., police stations and fire stations) and street names and numbers.

In yet another example, the recognized text could also be used as landmarks that help locate where the user is relative to a map, in what direction the user is looking, and what the user is looking at. In fact, a local map can be retrieved from a storage device 111 to show the current location to the user. Thus, portable text recognition device 100 can be implemented as a portable travel assistant, thereby providing navigational help through complex or unfamiliar surroundings, such as for a tourist in a foreign city environment.

In step 284, method 200 applies language translation. Namely, the detected text information is sent to a language translation module stored in storage device 111 to convert the recognized text into the user's native language. It should be noted that steps 282 and 284 are implemented in the application software module 150.

In step 286, method 200 outputs the result visually and/or audibly to the user. Specifically, the result can be provided to the user via a display (e.g., LCD display) and/or a text-to-speech synthesis process and the speaker 114. It should be noted that the result can also be stored in a storage device 111 for later retrieval. In an alternative way to implement this embodiment, the detected text regions generated by step 220 could be indicated or highlighted on the display 115, thus allowing the user to select via a user input device 119 which text regions should be recognized and translated. Method 200 then ends in step 290.

Figure 3:
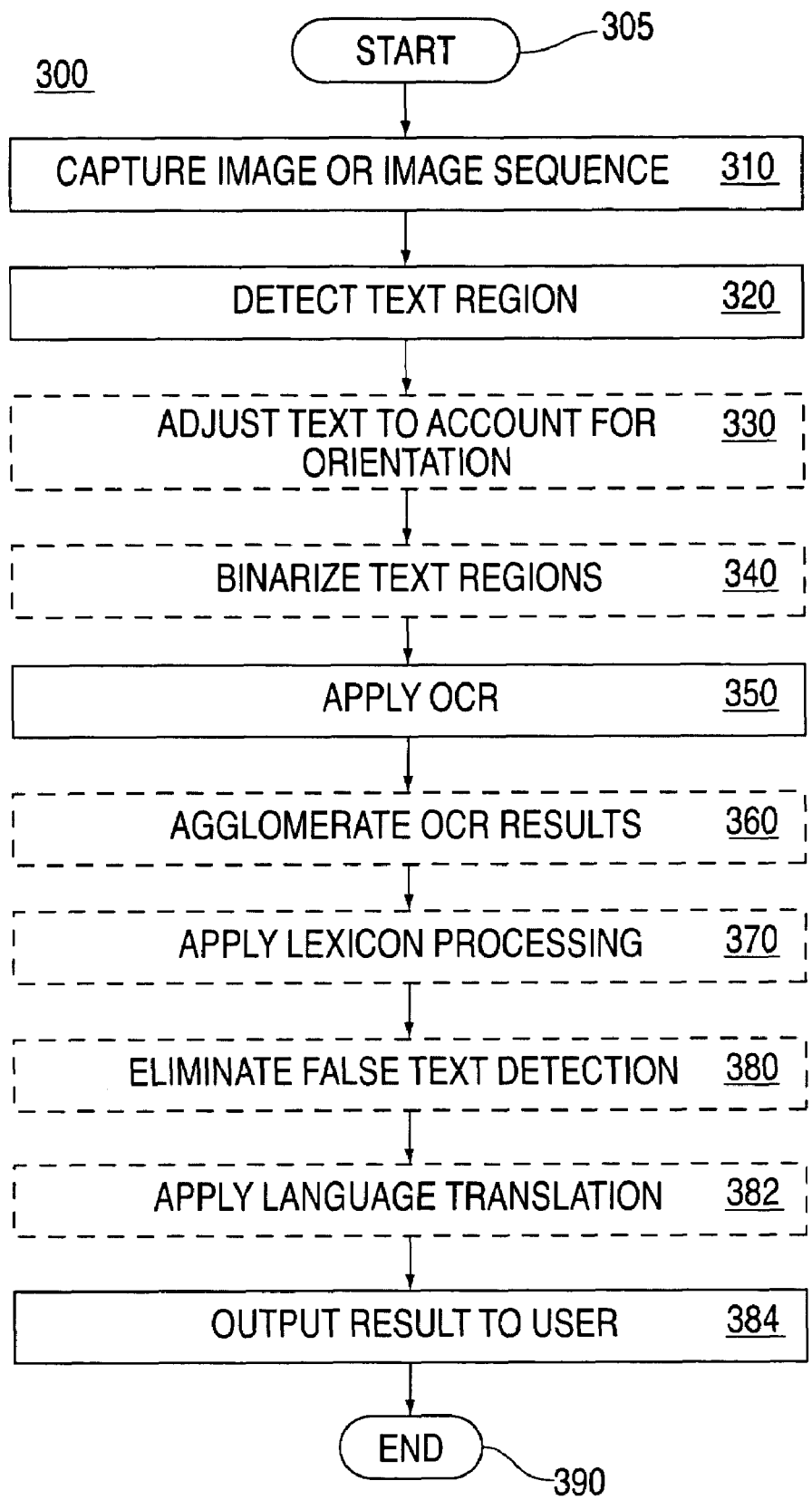
FIG. 3 illustrates a method of utilizing the portable text recognition system of the present invention in a second embodiment.

FIG. 3 illustrates a method of utilizing the portable text recognition system of the present invention in a second embodiment. In this second embodiment, the present device is deployed as a portable assistant to an individual who is visually impaired or who needs reading assistance. For example, a user shopping in a store can capture an imagery having text (e.g., taking a picture of the label of a product). Another example is a child taking a picture of a page in a book. The text within the captured imagery is detected and audibly broadcasted to the user via a speaker.

Thus, the portable text recognition device 100 can help a sight-impaired person navigate in an urban or commercial environment, select products from a grocery store shelf, read the label on a prescription bottle, or operate a vending machine. The recognized text would be sent to a speech synthesis module 152 stored in a storage device that produces an audio form via speaker 114 for the person with impaired sight to hear. Thus, portable text recognition device 100 can be a portable book reader for the sight impaired, or for children.

Specifically, method 300 starts in step 305 and proceeds to step 310. It should be noted that steps 310–380 are similar to steps 210–280. As such, the description for steps 310–380 is provided above.

In step 382, method 300 may optionally apply language translation if the detected text is not in the native language of the user. An example is where the visually impaired user is traveling abroad or the user is reading a book in a foreign language. It should be noted that step 382 is implemented in the application software module 150.

In step 384, method 300 outputs the result audibly to the user via a speaker. However, the result can also be provided to the user via a display (e.g., LCD display). It should be noted that the result can also be stored in a storage device 111 for later retrieval. Method 300 then ends in step 390.

Figure 4:
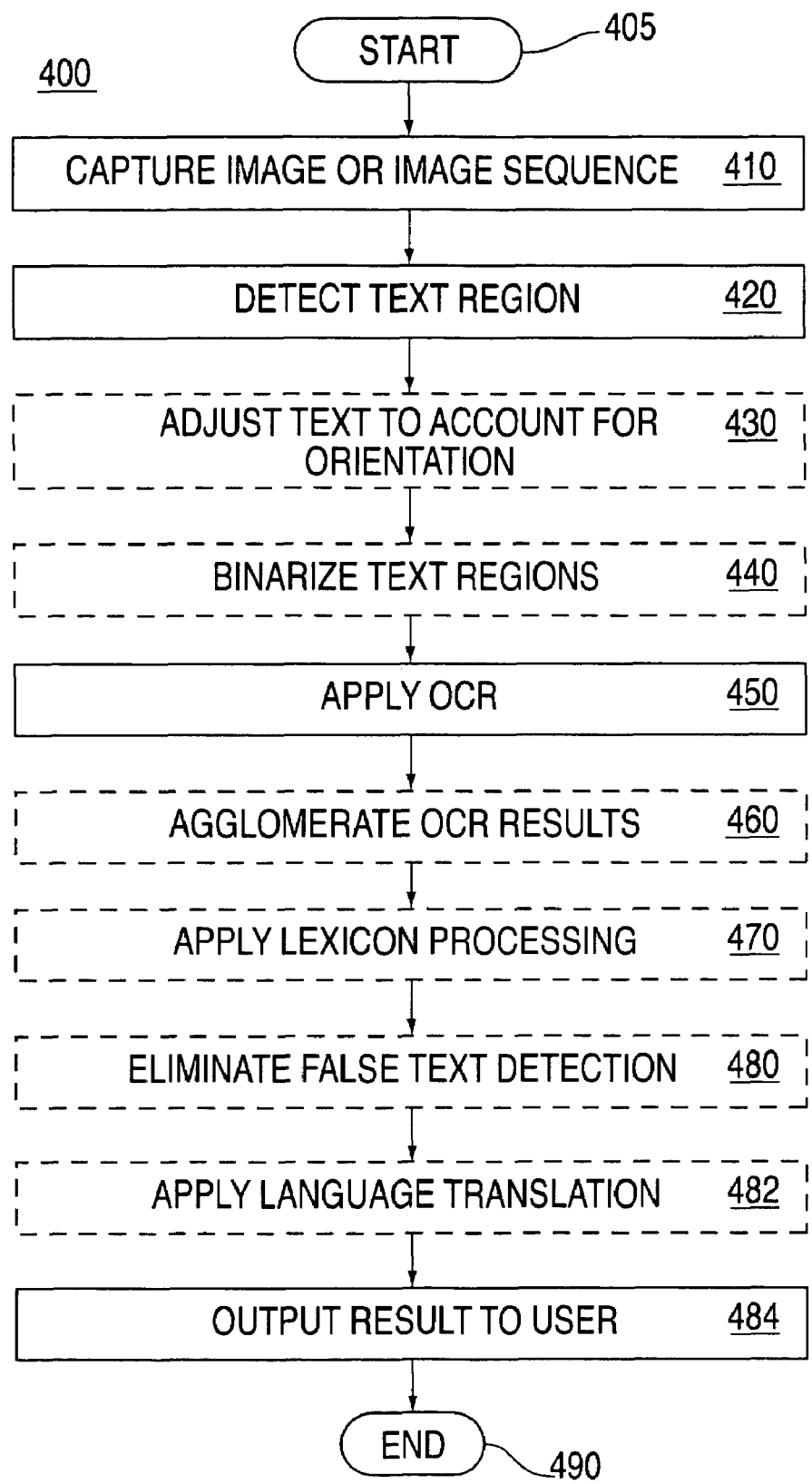
FIG. 4 illustrates a method of utilizing the portable text recognition system of the present invention in a third embodiment.

FIG. 4 illustrates a method of utilizing the portable text recognition system of the present invention in a third embodiment. In this third embodiment, the present device is deployed as a portable notebook. For example, a user in an educational environment can capture an imagery having text (e.g., taking a picture of a white board, view graph or a screen). The text within the captured imagery is detected and stored in a format that can be retrieved later for text processing, e.g., in a word processor format.

Specifically, method 400 starts in step 405 and proceeds to step 410. It should be noted that steps 410–480 are similar to steps 210–280. As such, the description for steps 410–480 is provided above.

In step 482, method 400 may optionally apply language translation if the detected text is not in the native language of the user. An example is where a user is attending a seminar, a class or a meeting where a foreign language is used. Again, this optional step can be employed in conjunction with step 470 where a lexicon pertaining to education topics (e.g., with specific technical terms pertaining to a specific field) can be previously loaded in a storage 111 of the portable text recognition device 100. It should be noted that step 482 is implemented in the application software module 150.

In step 484, method 400 outputs the result visibly to the user via a display (e.g., LCD display). It should be noted that the result can also be stored in a storage device 111 for later retrieval, e.g., as a word processing file. Method 400 then ends in step 490.

Figure 5:
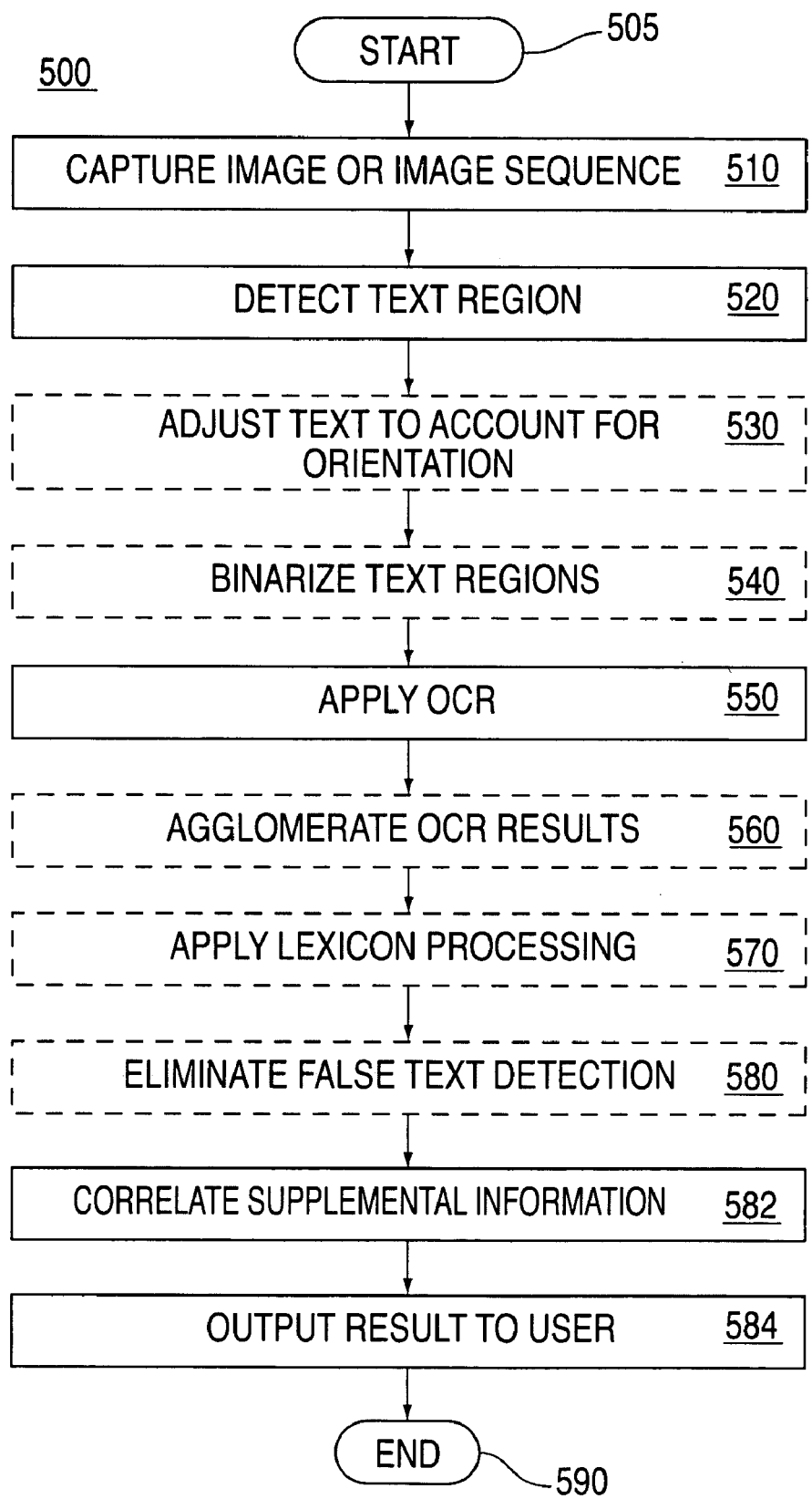
FIG. 5 illustrates a method of utilizing the portable text recognition system of the present invention in a fourth embodiment.

FIG. 5 illustrates a method of utilizing the portable text recognition system of the present invention in a fourth embodiment. In this fourth embodiment, the present device is deployed as a portable auxiliary information accessor. For example, a user in a business environment can capture an imagery having text (e.g., taking a picture of a bill board or a business card having an Internet or web address). The text within the captured imagery is detected and the Internet address is accessed to acquire additional information.

For example, a billboard ad may have a web address that contains more information about the product (perhaps even an audio or video clip) that could be immediately retrieved. The web address can be accessed via transmitter 113 and receiver 112.

Another example is where a user may receive a business card at a trade show and be able to immediately retrieve information from that person's home page, or a softcopy version of a printed document can be retrieved. The user can communicate with other remote people about the document rather than faxing the document or reading off the web address of the document, or get additional product information off the web, such as competitive pricing or product reliability.

Specifically, method 500 starts in step 505 and proceeds to step 510. It should be noted that steps 510–580 are similar to steps 210–280. As such, the description for steps 510–580 is provided above.

In step 582, method 500 correlates supplemental information based upon the detected text, e.g., a web address. The supplemental information is retrieved via the receiver 112 and transmitter 113. It should be noted that step 582 is implemented in the application software module 150.

In step 584, method 500 outputs the result visibly to the user via a display (e.g., LCD display). It should be noted that the result can also be stored in a storage device 111 for later retrieval, e.g., as a word processing file. Method 500 then ends in step 590.

Figure 6:
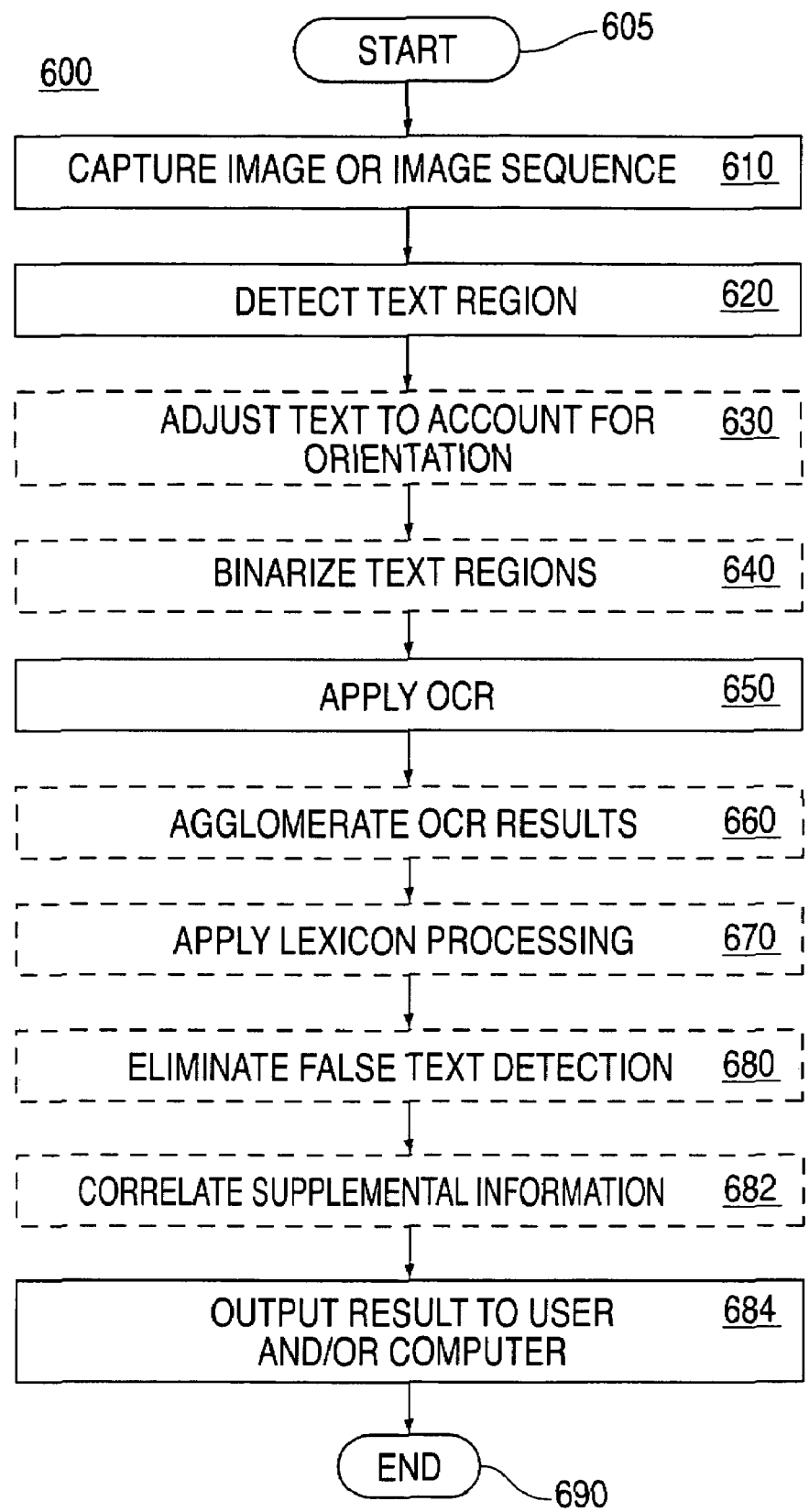
FIG. 6 illustrates a method of utilizing the portable text recognition system of the present invention in a fifth embodiment.

FIG. 6 illustrates a method of utilizing the portable text recognition system of the present invention in a fifth embodiment. In this fifth embodiment, the present device is deployed as a portable navigation assistant. For example, the portable unit is deployed in a vehicle for automatic reading of road signs and speed limit signs. The text within the captured imagery is detected and is provided to the computer in the vehicle for assisting the vehicle's navigation system or as a warning indicator to the driver on an instrument panel for speed limit monitoring.

Specifically, method 600 starts in step 605 and proceeds to step 610. It should be noted that steps 610–680 are similar to steps 210–280. As such, the description for steps 610–680 is provided above.

In step 682, method 600 correlates supplemental information based upon the detected text, e.g., road signs, highway numbers, exit numbers and the like. For example, method 600 may provide a list of restaurants, hotels, and famous landmarks that are in the immediate vicinity to the user based upon the road signs, highway numbers, and/or exit numbers. It should be noted that step 682 is implemented in the application software module 150.

In step 684, method 600 outputs the result visibly or audibly to the user via a display (e.g., LCD display) or a speaker and directly to the vehicle's navigational system via an output port 118. It should be noted that the result can also be stored in a storage device 111 for later retrieval.

For example, the portable text recognition system 100 may simply maintain a history log of detected road signs and exit numbers. Thus, if the vehicle breaks down on a highway and the driver is unable to recall which exit or roadway the vehicle is closest to, the driver can simply retrieve the history log to see which exit or roadway that the driver has recently encountered. The clock 118 can also be utilized to time stamp each occurrence of detected text, thereby allowing the driver to accurately communicate the location of his stranded vehicle and the approximate time from a text detection event, e.g., 5 minutes from exit 5 and so on.

Figure 7:
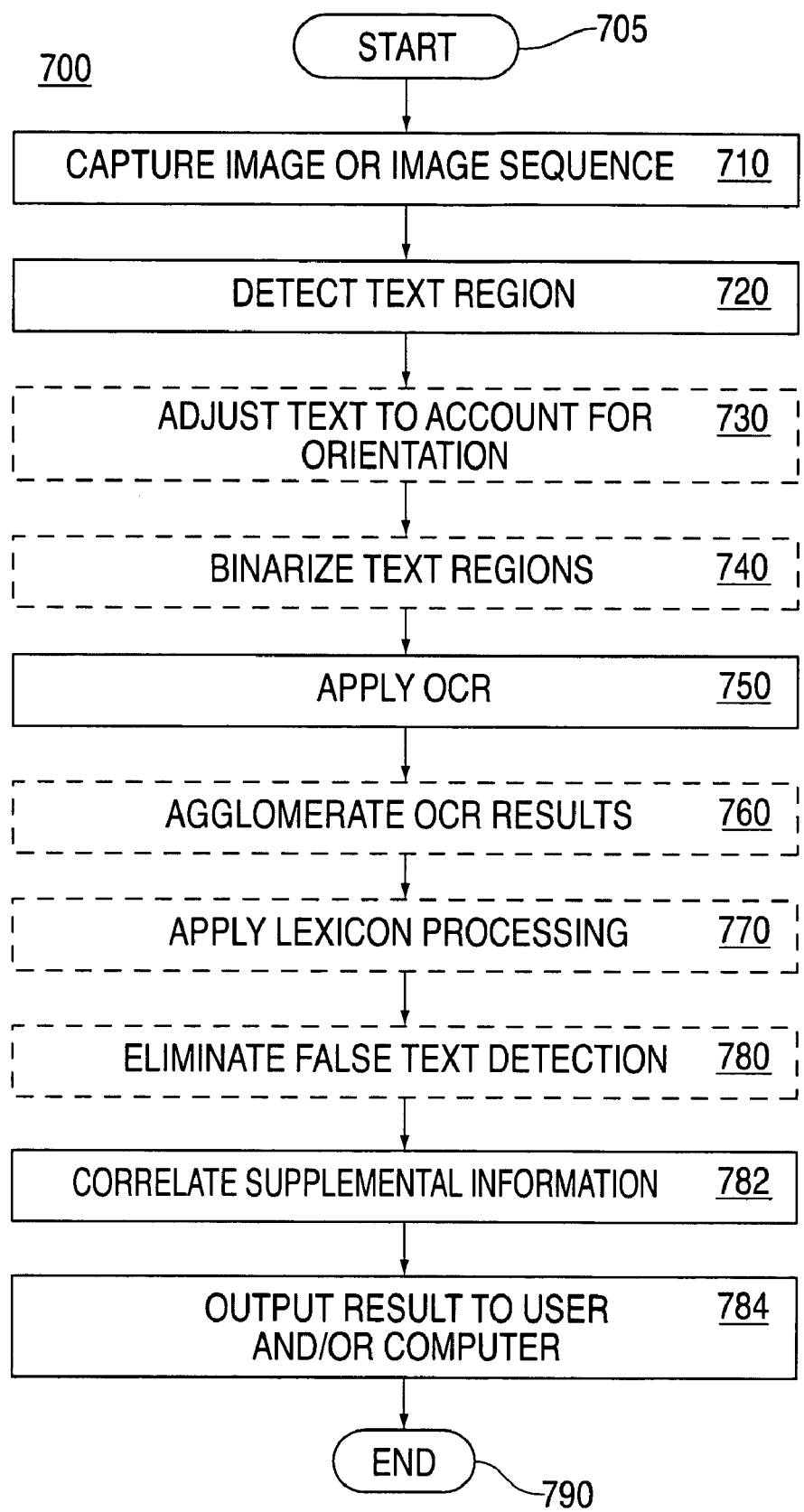
FIG. 7 illustrates a method of utilizing the portable text recognition system of the present invention in a sixth embodiment.

FIG. 7 illustrates a method of utilizing the portable text recognition system of the present invention in a sixth embodiment. In this sixth embodiment, the present device is deployed as a portable law enforcement assistant. For example, the portable unit is deployed in a police vehicle for reading license plates, vehicle identification numbers (VINs) or driver licenses and registrations. The text within the captured imagery is detected and is used to provide information to a law enforcement officer as to the status of a vehicle or a driver. It should be noted that the term "vehicle information" as used in the present application comprises one or more of the following information: license plate numbers, vehicle identification numbers (VINs), driver license numbers, registration numbers, current status of license holder's driving privilege, status of vehicle (e.g., currently registered, not registered, reported as stolen and so on). In addition, vehicle information includes boats registration numbers.

Examples may include but not limited to an attachment to a police radar gun, felon detection by reading and running license plates autonomously, and stolen vehicle identification, parking lot access, billing and vehicle security. Namely, the police officer can automatically enter vehicle license plate information as the officer walks or drives down a city street for timed parking violations (e.g., via time stamp with clock 117), or automatically entering driver's license ID information after a person has been stopped by the police.

Specifically, method 700 starts in step 705 and proceeds to step 710. It should be noted that steps 710–780 are similar to steps 210–280. As such, the description for steps 710–780 is provided above.

In step 782, method 700 correlates supplemental information based upon the detected text, e.g., a plate number or a driver license. The supplemental information is retrieved via the receiver 112 and transmitter 113. It should be noted that step 782 is implemented in the application software module 150.

In step 784, method 700 outputs the result visibly or audibly to the user via a display (e.g., LCD display) or a speaker and directly to the officer's motor vehicle database system via an output port 118. It should be noted that the result can also be stored in a storage device 111 for later retrieval. Method 700 then ends in step 790.

Figure 8:
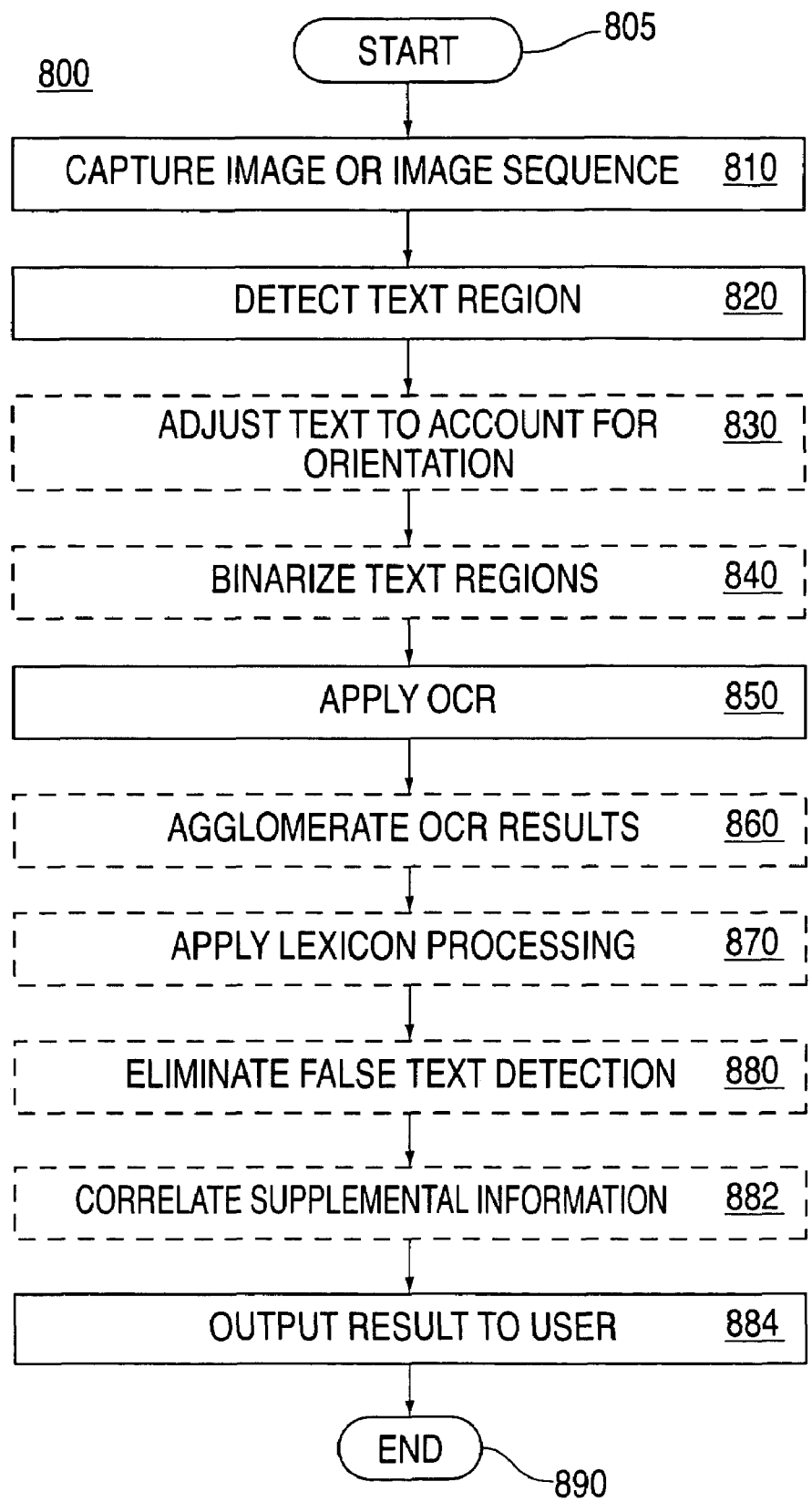
FIG. 8 illustrates a method of utilizing the portable text recognition system of the present invention in a seventh embodiment.

FIG. 8 illustrates a method of utilizing the portable text recognition system of the present invention in a seventh embodiment. In this seventh embodiment, the present device is deployed as a portable inventory assistant. For example, a user in a store or a warehouse can capture an imagery having text (e.g., taking a picture of a product on a shelf or high up on a scaffold). The text within the captured imagery is detected and is used for inventory control. Namely, the portable text recognition device 100 can control inventory and shelf restocking (as an alternative identification technology to bar code reading). In another example, the odometer reading for a returned rental car could be automatically captured.

Specifically, method 800 starts in step 805 and proceeds to step 810. It should be noted that steps 810–880 are similar to steps 210–280. As such, the description for steps 810–880 is provided above.

In step 882, method 800 may optionally correlate supplemental information based upon the detected text, e.g., brand name and generic product name. The supplemental information may include but is not limited to the current volume of a particular product in stock, the status as to shipment of a particular product, the cost of a particular product in stock, and the like. The supplemental information is retrieved via the receiver 112 and transmitter 113. It should be noted that step 882 is implemented in the application software module 150.

In step 884, method 800 outputs the result visibly or audibly to the user via a display (e.g., LCD display) or a speaker. It should be noted that the result can also be stored in a storage device 111 for later retrieval. Method 800 then ends in step 890.

Finally, the portable text recognition device 100 can also index and archive image and video, both for storage identification, and as a means to increase the accuracy of targeted marketing programs. An example of this is to apply this technique on an internet photo server using the results to increase the accuracy that the pop up ads the user seeks is relevant.

Thus, the portable text recognition device 100 can be implemented to provide different levels of functionality with different hardware and software complexity. Although each embodiment can be implemented and manufactured as a dedicated unit for a particular application, the portable text recognition device 100 can be designed to receive upgrade modules (in hardware form or software form) to implement one or more of the above disclosed embodiments.

Although various embodiments which incorporate the teachings of the present invention have been shown and described in detail herein, those skilled in the art can readily devise many other varied embodiments that still incorporate these teachings.

What is claimed is:

1. Method for portably recognizing text in a captured imagery, said method comprising the steps of:
    (a) capturing an imagery having text information using a portable device;
    (b) portably detecting a text region in the captured imagery in real time;
    (c) applying optical character recognition (OCR) processing to said detected text region to produce recognized text;
    (d) correlating supplemental information extrinsic to said imagery with said recognized text; and
    (e) providing said recognized text and said supplemental information as an output of said portable device.

2. Apparatus for portably recognizing text in a captured imagery, said apparatus comprising:
    means for capturing an imagery having text information using a portable device;
    means for portably detecting a text region in the captured imagery in real time;
    means for applying optical character recognition (OCR) processing to said detected text region to produce recognized text;
    means for correlating supplemental information extrinsic to said imagery with said recognized text; and
    means for providing said recognized text and said supplemental information as an output of said portable device.

3. The method of claim 1, wherein said providing step (e) provides said output via a display.

4. The method of claim 1, wherein said providing step (e) provides said output via a speaker.

5. The method of claim 1, wherein said providing step (e) provides said output via an output port.

6. The method of claim 1, wherein said supplemental information contains travel information.

7. The method of claim 1, wherein said supplemental information contains vehicle information.

8. The method of claim 1, wherein said supplemental information contains information obtained from a web address.

9. The method of claim 1, further comprising the step of:
    (f) dynamically applying lexicon processing in accordance with the correlated supplemental information.

10. The method of claim 1, further comprising the step of:
    (f) applying language translation in accordance with said recognized text.

11. The method of claim 1, further comprising the step of:
    (b1) adjusting said detected text region to produce a rectified image prior to the application of OCR processing.

12. The method of claim 11, further comprising the step of:
    (b2) applying binarization to said rectified image prior to the application of OCR processing.

13. The method of claim 1, further comprising the step of:
    (c1) applying lexicon processing subsequent to said OCR processing to produce said recognized text.

14. The method of claim 13, wherein said lexicon processing is dynamically applied.

15. The method of claim 1, further comprising the step of:
    (c1) applying false text elimination processing subsequent to said OCR processing to produce said recognized text.

16. The method of claim 1, further comprising the step of:
    (f) providing said recognized text to a navigation system.

17. A computer readable medium containing an executable program for portably recognizing text in a captured imagery, where the program performs the steps of:
    (a) capturing an imagery having text information using a portable device;
    (b) portably detecting a text region in the captured imagery in real time;
    (c) applying optical character recognition (OCR) processing to said detected text region to produce recognized text;
    (d) correlating supplemental information extrinsic to said imagery with said recognized text; and
    (e) providing said recognized text and said supplemental information as an output of said portable device.

* * * * *